United States Patent
Lee

(10) Patent No.: US 8,092,341 B2
(45) Date of Patent: Jan. 10, 2012

(54) METHOD OF CONTROLLING CONTINUOUS VARIABLE TRANSMISSION

(75) Inventor: Howook Lee, Gangnam-gu (KR)

(73) Assignees: Kia Motors Corporation, Seoul (KR); Hyundai Motor Company, Seoul (KR)

(*) Notice: Subject to any disclaimer, the term of this patent is extended or adjusted under 35 U.S.C. 154(b) by 654 days.

(21) Appl. No.: 12/290,319

(22) Filed: Oct. 29, 2008

(65) Prior Publication Data

US 2009/0270222 A1 Oct. 29, 2009

(30) Foreign Application Priority Data

Apr. 25, 2008 (KR) .................. 10-2008-0038877

(51) Int. Cl.
*B60W 10/04* (2006.01)
*B60W 10/10* (2006.01)
*F16H 61/662* (2006.01)
*F16H 61/664* (2006.01)
*F16H 61/00* (2006.01)
*F16H 15/38* (2006.01)

(52) U.S. Cl. ............. 477/50; 477/37; 477/43; 477/45

(58) Field of Classification Search ............. 477/34–50
See application file for complete search history.

(56) References Cited

U.S. PATENT DOCUMENTS

| 4,945,481 | A  | * | 7/1990  | Iwatsuki et al. | 701/54 |
| 6,691,012 | B2 | * | 2/2004  | Nishida et al.  | 701/60 |
| 7,637,843 | B2 | * | 12/2009 | Yamaguchi       | 477/44 |
| 7,909,728 | B2 | * | 3/2011  | Tabata et al.   | 477/3  |

FOREIGN PATENT DOCUMENTS

| JP | 2000-299904   | 10/2000 |
| JP | 2001-225672   | 8/2001  |
| JP | 2004-092847 A | 3/2004  |
| JP | 2006-308060   | 11/2006 |
| KR | 2005-0064954  | 6/2005  |
| KR | 2007-0065017  | 6/2007  |

* cited by examiner

*Primary Examiner* — Tisha Lewis
(74) *Attorney, Agent, or Firm* — Edwards Wildman Palmer LLP

(57) ABSTRACT

A method of controlling a transmission (e.g., CVT) comprises dividing the entire range of an input torque to a transmission from an engine into a plurality of partial torque ranges; setting the maximum torque of the respective partial torque ranges as a representative torque of the respective partial torque ranges; and setting a target hydraulic pressure, which is to be provided to the transmission, according to the representative torque and a predetermined target speed ratio. The method allows a target hydraulic pressure for controlling a transmission to be maintained constant even though an input torque from an engine is changed, and allows the transmission to maintain a speed ratio constant, thereby ensure a stable and smooth ride.

4 Claims, 2 Drawing Sheets

METHOD OF CONTROLLING CONTINUOUS VARIABLE TRANSMISSION

CROSS-REFERENCE TO RELATED APPLICATIONS

The present application is based on and claims priority from Korean Application Serial Number 10-2008-0038877, filed on Apr. 25, 2008, the disclosure of which is hereby incorporated by reference herein in its entirety.

TECHNICAL FIELD

The present invention relates to a method of controlling a transmission, and more particularly, to a method of controlling hydraulic pressure applied to a transmission so as to maintain a stable speed ratio when a vehicle starts.

BACKGROUND ART

A transmission for a vehicle provides a speed-torque conversion (commonly known as "gear reduction" or "speed reduction") from a higher speed motor to a slower but more forceful output. A continuous variable transmission (CVT), which uses a belt as a variator that is a transmission element, receives power transmitted from an engine by a primary pulley, transmits the power to a secondary pulley by the belt, and outputs the power, on which speed change is performed by the secondary pulley, to driving wheels.

In the above-mentioned CVT, since a speed ratio is continuously changed due to the difference in diameter formed between the belt and the pulleys, hydraulic pressure applied to a pulley piston of a movable pulley of each pulley is controlled. Accordingly, the diameters formed between the belt and the pulleys are changed, so that a desired speed ratio is obtained.

A pulley clamping force, which is a force of a pulley pushing the belt, should be appropriately formed in order to allow power to be smoothly transmitted between the pulleys and belt without slip. The pulley clamping force is determined depending on the input torque input from the engine to the pulley. In order to form the pulley clamping force determined as described above, target hydraulic pressure corresponding to the pulley clamping force must be appropriately determined, and the hydraulic pressure applied to the pulley must be controlled to be the target hydraulic pressure.

Meanwhile, the start condition of a vehicle is a driving condition that is sensitive to a driver even though a speed ratio is slightly changed. In this state, the CVT should maintain a full low speed ratio, which is the lowermost speed ratio of the CVT, stable.

That is, when a vehicle provided with a CVT starts, the CVT should be controlled so that a target speed ratio is stably maintained at the full low speed ratio, in order to prevent irregular change of vehicle speed and engine speed, thereby ensuring ensure a stable ride.

However, in the related art, at the above-mentioned start condition of the vehicle, a target speed ratio is constant at the full low speed ratio, but the change of the input torque from the engine is relatively large. Accordingly, the target hydraulic pressure applied to the pulley is changed due to the change of the input torque. If the target hydraulic pressure is changed as described above, the speed ratio is substantially changed. For this reason, there is a problem in that a driver has a discomfort ride.

The above information disclosed in this Background Art section is only for enhancement of understanding of the background of the invention and therefore it may contain information that does not form the prior art that is already known in this country to a person of ordinary skill in the art.

SUMMARY

According to an embodiment of the present invention, a method of controlling a transmission comprises: dividing the entire range of an input torque to a transmission from an engine into a plurality of partial torque ranges; setting the maximum torque of the respective partial torque ranges as a representative torque of the respective partial torque ranges; and setting a target hydraulic pressure, which is to be provided to the transmission, according to the representative torque and a predetermined target speed ratio.

Preferably, the setting of the target hydraulic pressure may comprise: obtaining a current input torque to the transmission from the engine, identifying a partial torque range that includes the obtained input torque, and obtaining the representative torque of the identified partial torque range.

Preferably, the partial torque ranges may be set in the increasing or decreasing order of magnitude of torque.

Suitably, the setting of the target hydraulic pressure may include neglecting hydraulic pressure signal that is fed back.

Preferably, the transmission may be a CVT, and the target hydraulic pressure is provided to a pulley of the CVT.

According to the methods, a target hydraulic pressure for controlling a transmission can be maintained constant even though an input torque from an engine is changed, and the transmission can maintain a constant speed ratio, thereby ensuring a stable and smooth ride.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

For a better understanding of the nature and objects of the present invention, reference should be made to the following detailed description with the accompanying drawings, in which.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments.

Figure 1:
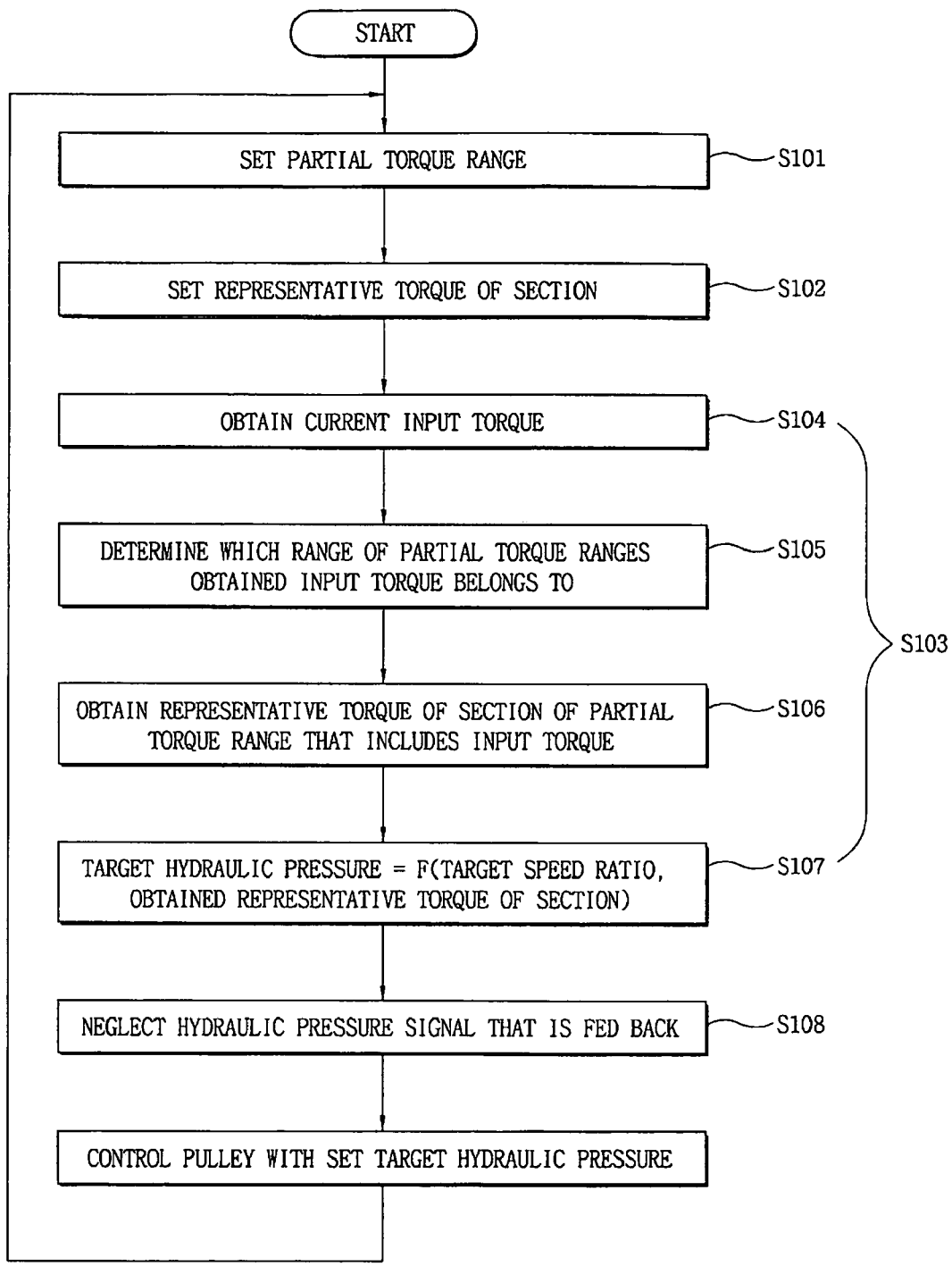
FIG. 1 is a flowchart illustrating a method of controlling a CVT according to an embodiment of the present invention.

Referring to FIG. 1, a method of controlling a CVT according to an embodiment of the present invention is described.

The entire range of input torque, which may be input from an engine to a CVT is divided into a plurality of partial torque ranges are set (S101). The maximum torque of the respective partial torque ranges is set as a representative torque of the respective partial torque ranges (S102). A target hydraulic pressure, which is to be provided to a pulley of the CVT, is set from the representative torque and a predetermined target speed ratio (S103).

The partial torque ranges are continuous sections corresponding to the magnitude of torque, and are set so as to connect the entire range of the input torque that is to be input from the engine to the CVT.

Figure 2:
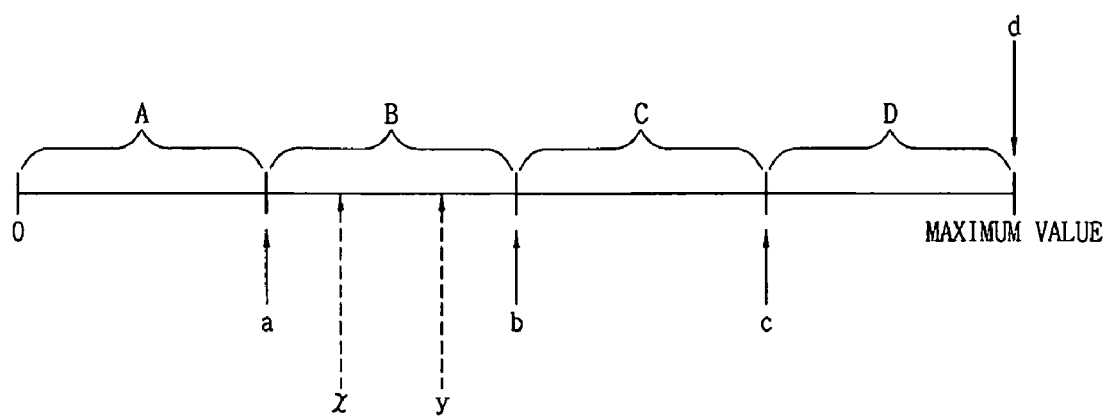
FIG. 2 is a view showing a partial torque range and a representative torque according to the present invention.

That is, the entire range of the input torque is represented by a straight line between "0" and the "maximum value" as shown in FIG. 2. In this case, the straight line is divided into a plurality of sections so that the partial torque ranges are set, each of the partial torque ranges is set as a continuous section without interruption therein, and the partial torque ranges are sequentially connected to each other without overlapping or interruption thereof. Therefore, the partial torque ranges are set so as to cover the entire range of the input torque.

As shown in FIG. 2, the entire range of the input torque is divided into four partial torque ranges A, B, C, and D. Representative torques a, b, c, and d are set for the partial torque ranges, respectively.

After setting representative torques for the partial torque ranges, a target hydraulic pressure is set (S103). In more detail, a current input torque to the CVT from the engine is obtained (104). Then, it is determined which range of the partial torque ranges the obtained input torque belongs to (S105). The representative torque of the partial torque range that includes the obtained input torque is identified (S106). The target hydraulic pressure is then calculated from the representative torque and the target speed ratio (S107).

That is, when a vehicle starts or is creep driven, an input torque input from the engine to the CVT is obtained, a partial torque range including the input torque is identified, and the representative torque of the partial torque range is then obtained. The target hydraulic pressure to be provided to the pulley of the CVT can be set according to the representative torque obtained as described above and a target speed ratio corresponding to a current travel condition of the vehicle. When a vehicle starts or is creep driven, the target speed ratio is set to a full low speed ratio and the target hydraulic pressure to be provided to the pulley of the current CVT is set by the full low speed ratio and the representative torque.

For example, if an input torque to be input from the current engine to the CVT is obtained as x of FIG. 2 and the target speed ratio is set to the full low speed ratio because the current vehicle is starting, B is identified as the partial torque range that includes the input torque x and b is set as the representative torque, so that a target hydraulic pressure to be provided to the pulley is set according to the full low speed ratio and the value of the representative torque b.

Accordingly, even though the input torque is changed to y, the representative torque, b does not change. Therefore, the full low speed ratio and the representative torque b, which are the basis used to set the target hydraulic pressure, keep constant. As a result, the target hydraulic pressure is set to be constant, which prevents the speed ratio of the CVT from being changed. Therefore, the vehicle can stably travel at a constant speed ratio.

As described above, if a target speed ratio is constant, a target hydraulic pressure to be provided to the pulley is not changed even though an input torque is changed in a partial torque range. Therefore, it is possible to remove a reverse effect that is caused by the sensitive control against the change of torque and to maintain a stable speed ratio, thereby allowing a driver to have a stable ride without discomfort.

Meanwhile, in the related art, a method of feeding back a hydraulic pressure signal, which corresponds to the hydraulic pressure to be actually provided to the pulley, to compensate the target hydraulic pressure has been used to set the target hydraulic pressure to be provided to the pulley of the CVT. The present method may further comprise a step of neglecting the hydraulic pressure signal that is fed back (S108). Therefore, it is possible to use a method of previously removing factors, which cause hydraulic pressure to be changed, by feedback control and maintaining stable target hydraulic pressure of the pulley.

The above-mentioned methods of controlling the CVT may be applied to a soft type hybrid vehicle as well as a vehicle provided with a general power train. Further, the present methods may maintain a speed ratio regardless of an input torque in a manual mode where a driver sets a transmission stage as well as when a vehicle starts or creep travels.

It should be noted that although the present invention is described above with respect to a CVT, it can be applied to other types of transmissions. As long as speed change is performed by small pressure change in other types of transmissions as well as in a CVT, the present methods may be applied to prevent that change in a speed ratio that is caused by the small change in pressure.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of controlling a transmission, the method comprising:
    dividing the entire range of an input torque to a transmission from an engine into a plurality of partial torque ranges;
    setting the maximum torque of the respective partial torque ranges as a representative torque of the respective partial torque ranges; and
    setting a target hydraulic pressure, which is to be provided to the transmission, according to the representative torque and a predetermined target speed ratio,
    wherein the setting of the target hydraulic pressure comprises: obtaining a current input torque to the transmission from the engine, identifying a partial torque range that includes the obtained input torque, and obtaining the representative torque of the identified partial torque range.

2. The method as defined in claim 1, wherein the partial torque ranges are set in the increasing or decreasing order of magnitude of torque.

3. The method as defined in claim 1, wherein the setting of the target hydraulic pressure further includes neglecting hydraulic pressure signal that is fed back.

4. The method as defined in claim 1, wherein the transmission is a continuous variable transmission (CVT), and the target hydraulic pressure is provided to a pulley of the CVT.

* * * * *